March 26, 1957   J. D. WHITACRE   2,786,294
ICE FISHING SIGNAL DEVICE
Filed June 14, 1956
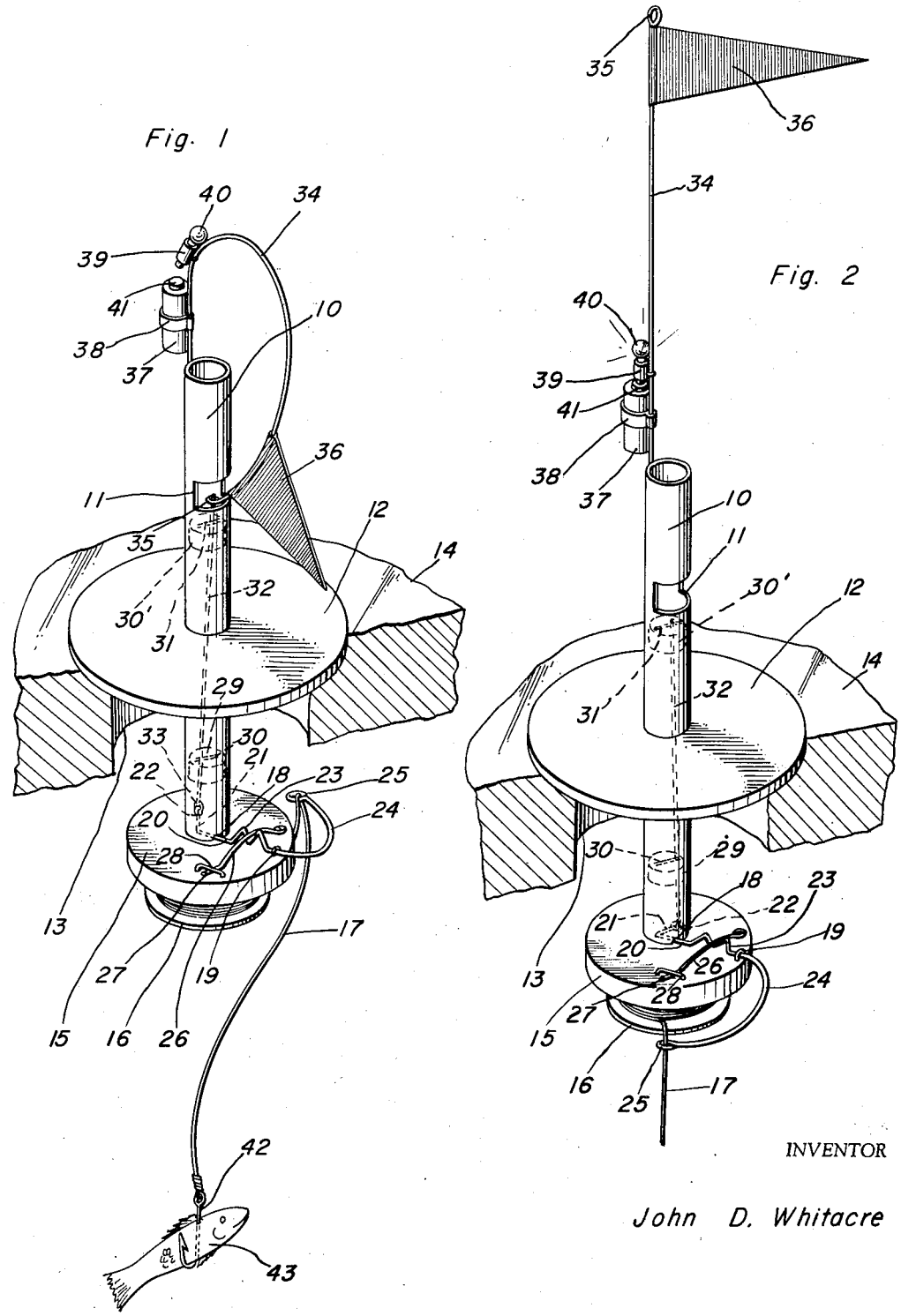
INVENTOR
John D. Whitacre United States Patent Office 2,786,294
Patented Mar. 26, 1957

2,786,294
ICE FISHING SIGNAL DEVICE
John D. Whitacre, Cadillac, Mich.
Application June 14, 1956, Serial No. 591,460
4 Claims. (Cl. 43—17)

This invention relates to an ice fishing signaling device.

It is an object of the present invention to provide an ice fishing signal device which will not freeze up and which may be used at night.

It is another object of the present invention to provide an ice fishing signal device of the above type wherein it will be unnecessary to clean the holes and device of slush and snow during the operation thereof.

Other objects of the invention are to provide an ice fishing signal device bearing the above objects in mind which is of simple construction, has a minimum number of parts, is inexpensive to manufacture, and is efficient in operation.

For other objects and for a better understanding of the invention, reference may be had to the following detailed decription taken in connection with the accompanying drawing, in which:

Figure 1 is a perspective view of a preferred embodiment of the present invention before being tripped by the fish; and Fig. 2 is a perspective view showing the device after it has been tripped by the fish.

Referring now more in detail to the drawing, 10 represents an elongated hollow cylindrical member open at both ends and provided at its upper end with the arcuate rectangular slot 11, substantially as illustrated.

A circular plate 12 is secured to the central portion of the member 10 in suitable manner and supports the same within the opening 13 in the ice 14, and closing off the lower portion of the member 10. A second reduced circular plate 15 is suitably secured to the lower end of the member 10 and rotatably mounts on the undersurface thereof the reel 16 on which the line 17 is wound. The lower end of the tubular member 10 is provided with the opening 18 which is aligned radially with the eye 19 secured to the outer portion of the plate 15. A rod 20 is rotatably mounted in the eye 19 and extends inwardly through the opening 18 where it terminates in the vertical upwardly bent portion 21 formed at the end thereof with the eye 22. The rod 20 is formed with an M-shaped vertical bend 23 inwardly of the eye 19, the bend 23 lying in the same plane as the upwardly bent end 21. The outer end of the rod 20 is integrally formed with the arcuate handle portion 24 lying in a plane disposed at right angles to the upwardly bent portion 21 and bend 23, the handle 24 terminating in the eye 25 through which is threaded the fishing line 17. The bend 21 and bend 23 are retained in the vertical untripped position of Fig. 1 by means of an arcuate spring 26 secured at one end to the plate 15 which rests within the central portion of the M-shaped bend 23, the other end thereof being flat, as at 27, and resting under the staple 28.

A plug 29 is fixedly mounted within the lower end of the tubular member 10 and is provided with a transverse slot 30. A second plug 30' is fixedly mounted within the upper portion of the tubular member 10 below the opening 11 and is provided with a transverse slot 31 aligned vertically with the slot 30. A nickel plated piano wire 32 is provided within a tubular member 10, extending through the slots 30 and 31 being formed at its lower end with a loop 33 which is pivotally threaded through the loop 22. The upper end of the wire 32 extends upwardly into the opening 11.

A spring wire 34 is fixedly mounted at its lower end on the upper end of the tubular member 10 at the side thereof remote from the opening 11 and is formed at its upper end with the loop 35. A flag 36 is fixedly carried by the wire 34 adjacent the loop 35.

A dry cell battery 37 is fixedly carried by the lower end of the wire 34 by means of the clamp strap 38, one terminal of the battery being grounded to the wire 34. An electric lamp socket 39 is mounted on and grounded to the wire 34 above the battery 37 and holds the lamp 40 which is in electrical contact with the terminal 41 of the battery when the wire is in the raised position of Fig. 2, whereby to illuminate the lamp 40 and thereby the flag 36, to permit fishing at night. Thus, the circuit of the lamp is closed when the flag is in the raised position. However, upon bending the wire 34 to the position of Fig. 1 and retaining the same in the bended position by the engagement of the loop 35 thereof with the upper end of the rod 32, the flag will be lowered and contact between the lamp 40 and the battery 37 will be broken. This is the untripped, normal position of the device.

A fish hook 42 is carried by the line 17 (nylon) and upon the fish 43 biting the handle 24 of the rod 20 will be rotated through ninety degrees to the vertical position of Fig. 2, the line unreeling through the eye 25 from the reel 16. This motion of the handle 24 will rotate the rod 20 and the upwardly bent end 21 thereof through ninety degrees to the horizontal position of Fig. 2 which draws the wire 32 downwardly and releases the loop 35. This permits the wire 34 to spring into the vertical position with the flag up, and simultaneously illuminates the lamp 40 by establishing contact with the latter automatically with the battery 37.

It will be apparent that the device will not freeze up and will permit fishing at night. It will also eliminate the necessity of going out and cleaning the device of slush and snow since the plate 12 will conceal the lower portion from the snow and slush.

While various changes may be made in the detail construction, it shall be understood that such changes shall be within the spirit and scope of the present invention as defined by the appended claims.

What I claim as new and desire to protect by Letters Patent of the United States is:

1. An ice fishing signal device comprising a hollow vertical member adapted to be positioned within an opening in the ice, a horizontal plate secured to the central portion of said hollow member and adapted to support the same by resting directly on the ice surrounding the opening therein, a spring wire connected to the upper end of said hollow member carrying a signal flag, a fishing reel rotatably mounted at the bottom of said hollow member on a second reduced plate secured to the lower end thereof and including a fishing line and hook, means for retaining said wire in a downwardly bent, inoperative position, and trigger means for releasing said wire and last mentioned means upon the fish biting and pulling the fish line, said means for retaining the wire in the lowered bent position comprising said hollow member having an opening at the side thereof remote from said wire near its upper end, an upper plug mounted within said hollow member below said opening, a lower plug mounted in said hollow member near the bottom thereof, said first and second plugs having laterally elongated, vertically aligned slots, and a wire extending through said plugs within said slots, the upper end of said wire extending into said opening, the end of said first wire being formed with a loop adapted to engage the upper end of said second wire.

2. An ice fishing signal device according to claim 1, said trigger means comprising said hollow member at the lower end thereof on the upper surface of said second plate having an opening, an eye secured to said second plate and aligned radially with said hollow member opening, a rod rotatably mounted in said eye and extending inwardly through said opening and terminating in an upwardly bent vertical portion terminating in a second eye, said second eye being looped through a third eye formed at the lower end of said second wire whereby to draw said second wire downwardly upon rotation of said vertical upwardly bent portion to a horizontal position against said second plate said rod at its outer end being integrally formed with a curved handle terminating in a fourth eye having said fishing line threaded therethrough, and spring means for retaining said handle in a horizontal position with said upwardly bent portion in a vertical position, until rotated by the fish biting.

3. An ice fishing signal device according to claim 2, said spring means comprising said rod intermediate said hollow member opening and first eye being formed with an M-shaped portion lying in the same vertical plane as said upwardly bent portion and at right angles to said handle, an elongated spring secured at one end to said second plate and resting within the central portion of said M-shaped bend, and a staple secured to said second plate and receiving thereunder the free end of said spring.

4. An ice fishing signal device according to claim 3, including a battery mounted on the first wire above the upper end of said hollow member, said battery being grounded through said wire and having its terminal disposed uppermost, a lamp socket secured to and grounded to said first wire above said terminal, and a lamp positioned within said socket and in contact with said battery terminal when said first wire is in a vertical position whereby to break contact of said lamp when the wire is bent downwardly and to automatically illuminate said lamp upon the tripping of said wire and the movement of the same to a vertical position.

References Cited in the file of this patent

UNITED STATES PATENTS

| | | |
|---|---|---|
| 2,575,156 | Baugh et al. | Nov. 13, 1951 |
| 2,720,719 | Stancheck et al. | Oct. 18, 1955 |